US006757676B1

(12) United States Patent
Sugaya et al.

(10) Patent No.: US 6,757,676 B1
(45) Date of Patent: Jun. 29, 2004

(54) TEXT MINING METHOD AND APPARATUS ALLOWING A USER TO ANALYZE CONTENTS OF A DOCUMENT SET FROM PLURAL ANALYSIS AXES

(75) Inventors: Natsuko Sugaya, Kawasaki (JP); Katsumi Tada, Kawasaki (JP); Tadataka Matsubayashi, Yokohama (JP); Akihiko Yamaguchi, Yokohama (JP); Yasuhiko Inaba, Yokohama (JP); Mikihiko Tokunaga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 09/649,961

(22) Filed: Aug. 29, 2000

(30) Foreign Application Priority Data

May 9, 2000 (JP) ........................................ 2000-142231

(51) Int. Cl.[7] .............................. G06F 17/30; G06F 7/00
(52) U.S. Cl. ......................................... 707/5; 707/104.1
(58) Field of Search ...................... 707/5, 104.1; 704/9; 715/500

(56) References Cited

U.S. PATENT DOCUMENTS

| 5,062,074 | A | | 10/1991 | Kleinberger |
| 5,546,516 | A | | 8/1996 | Austel et al. |
| 6,006,223 | A | | 12/1999 | Agrawal et al. |
| 6,154,737 | A | * | 11/2000 | Inaba et al. ..................... 707/3 |
| 6,356,923 | B1 | * | 3/2002 | Yano et al. ................. 717/127 |
| 6,374,209 | B1 | * | 4/2002 | Yoshimi et al. ................. 704/9 |
| 6,532,469 | B1 | * | 3/2003 | Feldman et al. ............ 707/102 |

FOREIGN PATENT DOCUMENTS

JP    11-015895    1/1999

OTHER PUBLICATIONS

Journal of Information Processing Society of Japan, vol. 40, No. 4, Apr., 1999, pp. 358–364.
Information Processing Society of Japan, Meeting of Information Learning Foundation 55–8, Jul. 16, 1999, Watanabe et al, pp. 57–64.

Majima, Nikkei Byte, Oct., 1996, pp. 158–167.

H. Lee et al, "A Multi–Dimensional Data Visulization Tool for Knowledge Discovery in Databases", Computer Software and Applications Conference, Aug. 1995, pp. 26–31.

H. Lee et al, "Visualization Support for Data Mining", IEEE Inc., vol. 11, No. 5, Oct. 1996, pp. 69–75.

D. Cook et al, "Graph–Based Data Mining", IEEE Intelligent Systems, vol. 15, No. 2, Mar. 2000, pp. 32–41.

M. Lux, "Level of Data–A Concept for Knowledge Discovery in Information Spaces", IEEE Intelligent Systems, Jul. 1998, pp. 131–136.

* cited by examiner

*Primary Examiner*—Greta Robinson
*Assistant Examiner*—Susan Rayyan
(74) *Attorney, Agent, or Firm*—Mattingly, Stanger & Malur, P.C.

(57) ABSTRACT

A text mining method whereby documents (texts) can be analyzed from a wide variety of visual points. The text mining method includes: distinctive word and/or phrase extraction step of extracting words and/or phrases characteristically emerging in a processing subject document set obtained by taking out whole or a part of a set of documents registered beforehand; definition information setting step of setting definition information including a specified word or phrase or specified bibliography information; coincident word and/or phrase acquisition step of acquiring coincident words and/or phrases coincident in a predetermined range with a word or phrase or bibliography information included in said definition information from among words and/or phrases extracted at said distinctive word and/or phrase extraction step; and multiplex coincident word and/or phrase acquisition step of acquiring coincident words and/or phrases coincident in a predetermined range with an individual word or phrase or bibliography information acquired from each of a plurality of different definition information pieces.

17 Claims, 13 Drawing Sheets

TEXT MINING METHOD AND APPARATUS ALLOWING A USER TO ANALYZE CONTENTS OF A DOCUMENT SET FROM PLURAL ANALYSIS AXES

BACKGROUND OF THE INVENTION

The present invention is intended for a data base of registered documents, and relates to a document processing technique for acquiring various kinds of information concerning a specified document set.

With the spread of word processors and personal computers in recent years, computerized information generated by them is increasing. Furthermore, computerized information available from WWW (World Wide Web), electronic mail, electronic news, and so on is also rapidly increasing. Therefore, it has become an important problem in enterprises to analyze contents of the computerized information and make the most thereof effectively.

In general, a large quantity of computerized information is described in many cases in a text form, i.e., in a composition form. Such text information such as questionnaires of free answer form is difficult to mechanically analyze, and consequently has heretofore been subjected to analysis using human work. This analysis using human work has the following problems.

(1) It is necessary to read all documents to be processed. In the case where the documents are increased, the human analysis is not practical.

(2) Since an analysis is made on the basis of subjective judgment, the result differs depending on the knowledge of the analyst and the degree of skill.

As such a technique of supporting the human analysis, the need for text mining is becoming strong. The processing procedure of text mining is described concretely in "Text mining—Knowledge finding by automatic analysis of massive document data—", Nasugawa et al. Journal of Information Processing Society of Japan, Vol. 40, No. 4, April 1999 pp. 358–364, and "Text mining based on keyword association", Watanabe et al. Information Processing Society of Japan, Meeting of Information Learning Foundation 55-8, Jul. 16, 1999, pp. 57–64. Hereafter, this is referred to as related art 1. The text mining is intended for text information registered beforehand, and finds new knowledge on the basis of coincidence relations and emergence tendency of words and/or phrases included in information to be processed. To be concrete, as regards a set of documents to be processed, an axis serving as a visual point for making an analysis is set, and words and/or phrases representing a feature of the document set are acquired in association with components of the axis. Here, "words and/or phrases are acquired in association with components of the axis" means "words and/or phrases coincident with components of the axis in a predetermined range are acquired". By referring to the words and/or phrases, the user can grasp the tendency of the document set. For example, an example of the case where a set of newspaper accounts concerning "pathogenic colon bacilli O157" is analyzed by taking a publication month as the axis is shown in FIG. 2. By making an analysis by taking a publication month as the axis, words and/or phrases "infection, patient, symptoms, hospitalization, . . ." are acquired in association with "July" which is a component of the axis. Words and/or phrases "shock, school lunch, hospitalization, mass infection, . . ." are acquired in association with "August". Words and/or phrases "sales, minus, foodstuffs, perishables, . . ." are acquired in association with "September". By referring to the words and/or phrases, the user can grasp the tendency that a topic "patients infected with O157 are hospitalized" exists in the document set in "July", the tendency that a topic "mass infection with O157 is caused by school lunch" exists in the document set in "August", and the tendency that a topic "the sales of perishables have fallen under the influence of O157" exists in the document set in "September". In a PAD (Problem Analysis Diagram) diagram of FIG. 3, the processing procedure of the related art 1 is shown. First, at step 300, a document set which becomes the processing subject of text mining is defined.

In the case of a data base of documents, such as questionnaires, collected on the basis of a certain view-point beforehand, it is set as a document set to be processed as it is. In the case of a data base of documents, such as newspaper accounts, including diverse viewpoints of politics, economy, sports, and so on, full text search is conducted according to the analysis object of the user and the document set is defined. The full text search is such a technique that a full text in documents to be processed is inputted to a computer system to form a data base at the time of registration and the data base is searched at the time of retrieval for all documents including a character string specified by a user. The full text search is described in detail in "Present situation and future of index processing fast full text search technique which holds the key", Majima, Nikkei byte, October 1996, pp. 158–167. Hereafter, this is referred to as related art 2. Subsequently, at step 301, words and/or phrases distinctive of the contents (hereafter referred to as distinctive words and/or phrases) are extracted from the document set preset at the step 300. The distinctive words and/or phrases may be extracted by referring to a dictionary, or may be extracted by using statistical information. At step 302, an axis serving as a visual point for making an analysis is set. Here, date, age, sex distinction, or the like provided as bibliography information of documents is set as an analysis axis, and specified words and/or phrases are set as components of the analysis axis. For example, in the case where it is desired to know difference of consciousness depending upon the age from questionnaires, the age is set here as the analysis axis. In this case, numerical values, such as "20" and "30", representing the age become components of the analysis axis. Finally at step 303, words and/or phrases coincident with a component of the axis in a predetermined range are acquired. As the predetermined range, the same document, the same paragraph, the same sentence, m words, n characters (where m and n are integers), or the like can be used. As heretofore described, the related art 1 supports the user in grasping the tendency of the document set, by acquiring words and/or phrases in association with the components of the analysis axis. Thus, in the related art 1, words and/or phases distinctive of the document set to be processed are automatically acquired in association with components of the analysis axis. Therefore, it is possible to lighten the burden of the analyst and reduce the difference in analysis result between analysts.

In the related art 1 heretofore described, words and/or phases distinctive of the document set to be processed are automatically acquired in association with components of the analysis axis. Therefore, it becomes possible to lighten the burden of the analyst and reduce the difference in analysis result caused by the knowledge and degree of the skill of the analysts.

However, the related 1 has problems hereafter described. As shown in FIG. 3, in the related art 1, an analysis is made on the basis of only the coincidence relations with individual components of the analysis axis. In the case where it is desired to analyze coincidence relations with a plurality of different visual points, i.e., combinations of a plurality of analysis axes, it is necessary to conduct text mining for each of analysis axes, and the user must combine the results and analyze them. When the user makes an analysis, the user begins the analysis from such a state that the user does not know the contents of the document set. Therefore, it is difficult to determine one visual point from the beginning. However, the related art 1 has the above described problems, and an analysis cannot be made in combinations of a wide variety of visual points.

SUMMARY OF THE INVENTION

An object of the present invention is to provide a document processing method and system, and a computer readable storage medium which provide a text mining function allowing the user to analyze the contents of a document set from a plurality of visual points and which thereby facilitate analyzing the tendency of a document set.

In order to improve the above described problems, the present invention provides the following processing steps.

A text mining method includes distinctive word and/or phrase extraction step of extracting words and/or phrases characteristically emerging in a processing subject document set obtained by taking out whole or a part of a set of documents registered beforehand; definition information setting step of setting definition information (such as information defining components of an analysis axis) including a specified word or phrase or specified bibliography information; and coincident word and/or phrase acquisition step of acquiring coincident words and/or phrases coincident in a predetermined range with a word or phrase or bibliography information included in the definition information from among words and/or phrases extracted at the distinctive word and/or phrase extraction step. A plurality of definition information pieces are included. Furthermore, the coincident word and/or phrase acquisition step includes analysis history storage step of storing the coincident words and/or phrases and a word or phrase or bibliography information included in the definition information coincident in a predetermined range with the coincident words and/or phrases as analysis history. Furthermore, the text mining method includes multiplex coincident word and/or phrase acquisition step of acquiring coincident words and/or phrases coincident in a predetermined range with an individual word or phrase or bibliography information acquired from each of a plurality of different definition information pieces. The multiplex coincident word and/or phrase acquisition step stores the coincident words and/or phrases, and an individual word or phrase or bibliography information acquired from each of the plurality of definition information pieces coincident in a predetermined range with the coincident words and/or phrases, as the analysis history. In addition, definition information addition step and/or definition information alteration step is included. The definition information addition step adds definition information including a specified word or phrase or specified bibliography information. In addition, the definition information addition step extracts coincident words and/or phrases obtained as those coincident with an individual word or phrase or bibliography information acquired from each of a plurality of different definition information pieces before addition of the definition information, from the analysis history, and puts forward the extracted coincident words and/or phrases as candidates of the coincident words and/or phrases of the multiplex coincident word and/or phrase acquisition step. The definition information alteration step alters a word or phrase or bibliography information included in specified definition information to a specified word or phrase or specified bibliography information. In addition, the definition information alteration step extracts coincident words and/or phrases obtained as those coincident with an individual word or phrase or bibliography information acquired from each of a plurality of different definition information pieces before addition of the altered definition information, from the analysis history, and puts forward the extracted coincident words and/or phrases as candidates of the coincident words and/or phrases of the multiplex coincident word and/or phrase acquisition step.

In order to achieve the above described object, programs implementing the above described functions or a recording medium storing programs may also be used.

DESCRIPTION OF THE EMBODIMENTS

The principle of the present invention will now be described by referring to FIG. 4.

If a text mining execution order is inputted by a user, distinctive words and/or phrases are extracted from a document set to be processed by the text mining, and from among the words and/or phrases thus extracted, words and/or phrases coincident with components of an analysis axis specified by the user are acquired. The present processing contents are the same as those of the related art 1. In an example shown in FIG. 4, a set of newspaper accounts concerning "O157" is a processing subject, and distinctive words and/or phrases "elementary school, mass infection, patient, stomachache, hemorrhagic, diarrhea, symptoms, hospitalization, . . . " are extracted. From among the extracted distinctive words and/or phrases, words and/or phrases coincident with components of a specified analysis axis (publishing month of newspaper in the example shown in FIG. 4) are acquired. Furthermore, in the present invention, the analysis axis and analysis result are preserved as analysis history, and a different analysis axis is added to a specified component of the analysis axis. Words and/or phrases coincident with each of groups formed of the specified component and components of the added analysis axis are acquired. Furthermore, when an analysis axis has been added to the specified component or an arbitrary analysis axis has been changed, words and/or phrases each having a high possibility of coincident with each of groups formed of components of a plurality of analysis axes are extracted from the analysis history as coincident word and/or phrase candidates, and words and/or phrases coincident with each of groups formed of components of a plurality of analysis axes are acquired from among the coincident word and/or phrase candidates. In this way, coincident words and/or phrases are narrowed down by using the analysis history, and then words and/or phrases actually coincident with each of the components are examined. As compared with the case where it is determined whether all distinctive words and/or phrases cooccur, therefore, a fast analysis can be made.

When adding an analysis axis including the specified words and/or phrases, the analysis axis is added to the specified component, and groups formed of the specified component and components of the added analysis axis are generated. In addition, at this time, words and/or phrases each having a high possibility of coincidence with each of the generated groups of components are extracted from the analysis history as coincident word and/or phrase candidates. Then, from among the coincident word and/or phrase candidates thus extracted, words and/or phrases coincident in a predetermined range with each of the generated groups of components are acquired.

Figure 4:
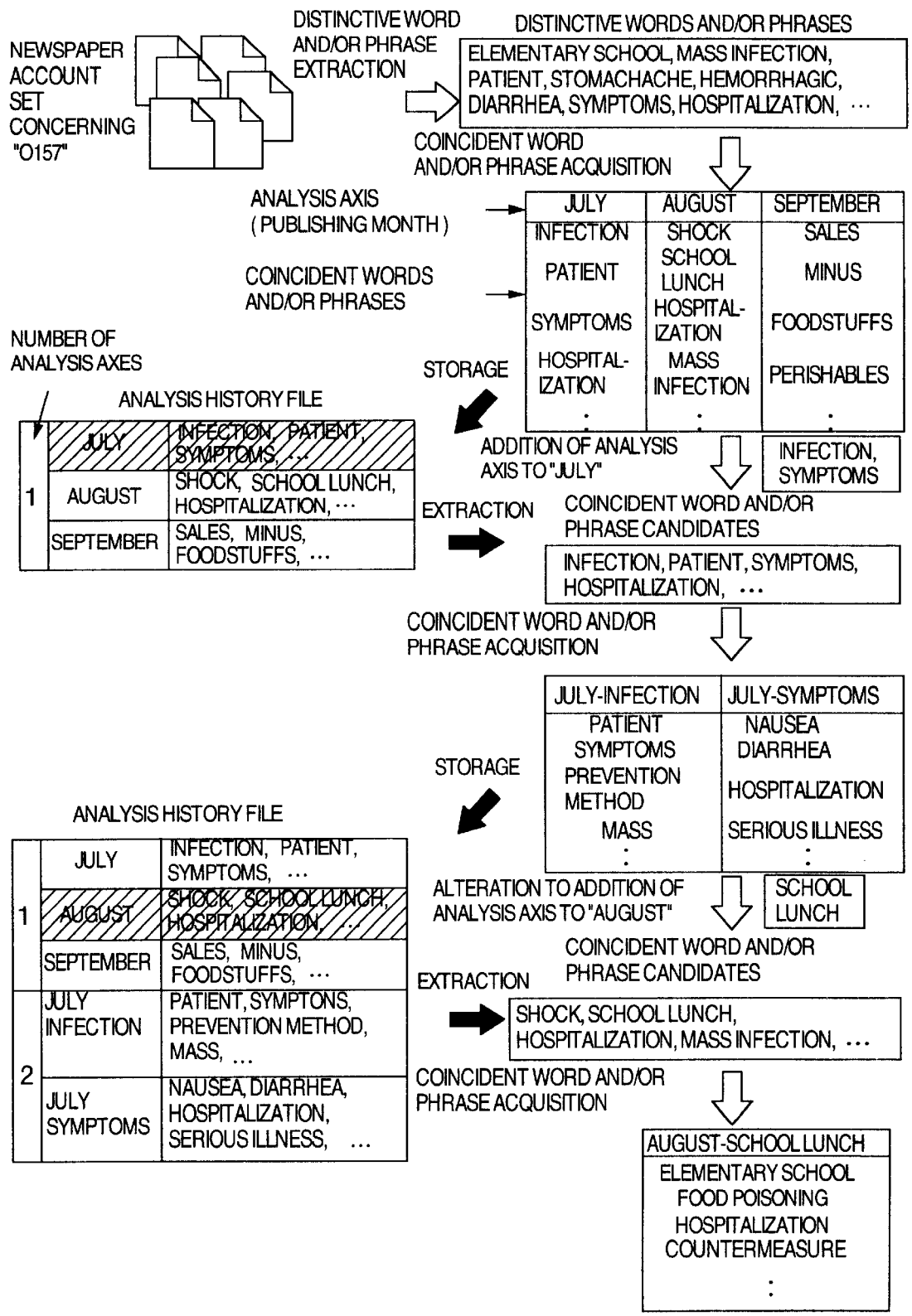
FIG. 4 is a diagram showing processing contents of a first embodiment of the present invention.

In the example shown in FIG. 4, there is added an analysis axis including coincident words and/or phrases "infection" and "symptoms" acquired in association with the component "July". And as coincident word and/or phrase candidates having a high possibility of coincidence with groups "July—infection" and "July—symptoms" formed of the specified component "July" and components of the added analysis axis, words and/or phrases "infection, patient, symptoms, hospitalization, . . . " coincident with "July" are extracted from the analysis history. From among the coincident word and/or phrase candidates, words and/or phrases coincident in a predetermined range with the component groups "July—infection" and "July—symptoms" are acquired. Here, "July—infection" means a group of "July" and "infection". "Coincident in a predetermined range with 'July—infection'" means "coincidence in a predetermined range with 'July'" and "coincidence in a predetermined range with 'infection'". The analysis axis and coincident words and/or phrases are preserved in the analysis history.

When altering the added analysis axis, the analysis axis is altered according to a user's order, and in addition, words and/or phrases each having a high possibility of coincidence with the component groups are extracted from the analysis history as coincident word and/or phrase candidates. And from among the coincident word and/or phrase candidates, words and/or phrases coincident in a predetermined range with the component groups are acquired. In an example shown in FIG. 4, "an analysis axis has been added to the component 'July'" is eliminated, and an analysis axis including a coincident phrase "school lunch" acquired in association with "August" is added. As coincident word and/or phrase candidates each having a high possibility of coincidence with a group "August—school lunch" formed of the specified component "August" and a component of the added analysis axis, words and/or phrases "shock, school lunch, hospitalization, mass infection, . . . " coincident with "August" are extracted from the analysis history. From among the coincident word and/or phrase candidates, words and/or phrases coincident in a predetermined range with the component group "August—school lunch" are acquired. The analysis axis and the coincident words and/or phrases are preserved (although not illustrated in FIG. 4).

As heretofore described, in a method shown in the present embodiment, the analysis axis and the analysis result are preserved as the analysis history. In addition, different analysis axis is added to a specified component of the analysis axis. Words and/or phrases coincident with each of groups formed of the specified component and components of the added analysis axis are acquired. Furthermore, when an analysis axis has been added to the specified component or an arbitrary analysis axis has been changed, words and/or phrases each having a high possibility of coincidence with each of groups formed of components of a plurality of analysis axes are extracted from the analysis history as coincident word and/or phrase candidates, and words and/or phrases coincident with each of groups formed of the specified component and components of the added analysis axis are acquired from among the coincident word and/or phrase candidates. In this way, coincident words and/or phrases are narrowed down by using the analysis history, and then words and/or phrases actually coincident with each of the components are examined. As compared with the case where it is determined whether all distinctive words and/or phrases coincide, therefore, a fast analysis can be made. By doing so, a text mining function capable of interactively making an analysis from a wide variety of visual points can be implemented. Therefore, it becomes possible to provide a document processing system whereby the user can analyze the tendency of the document set suitably and easily.

Figure 1:
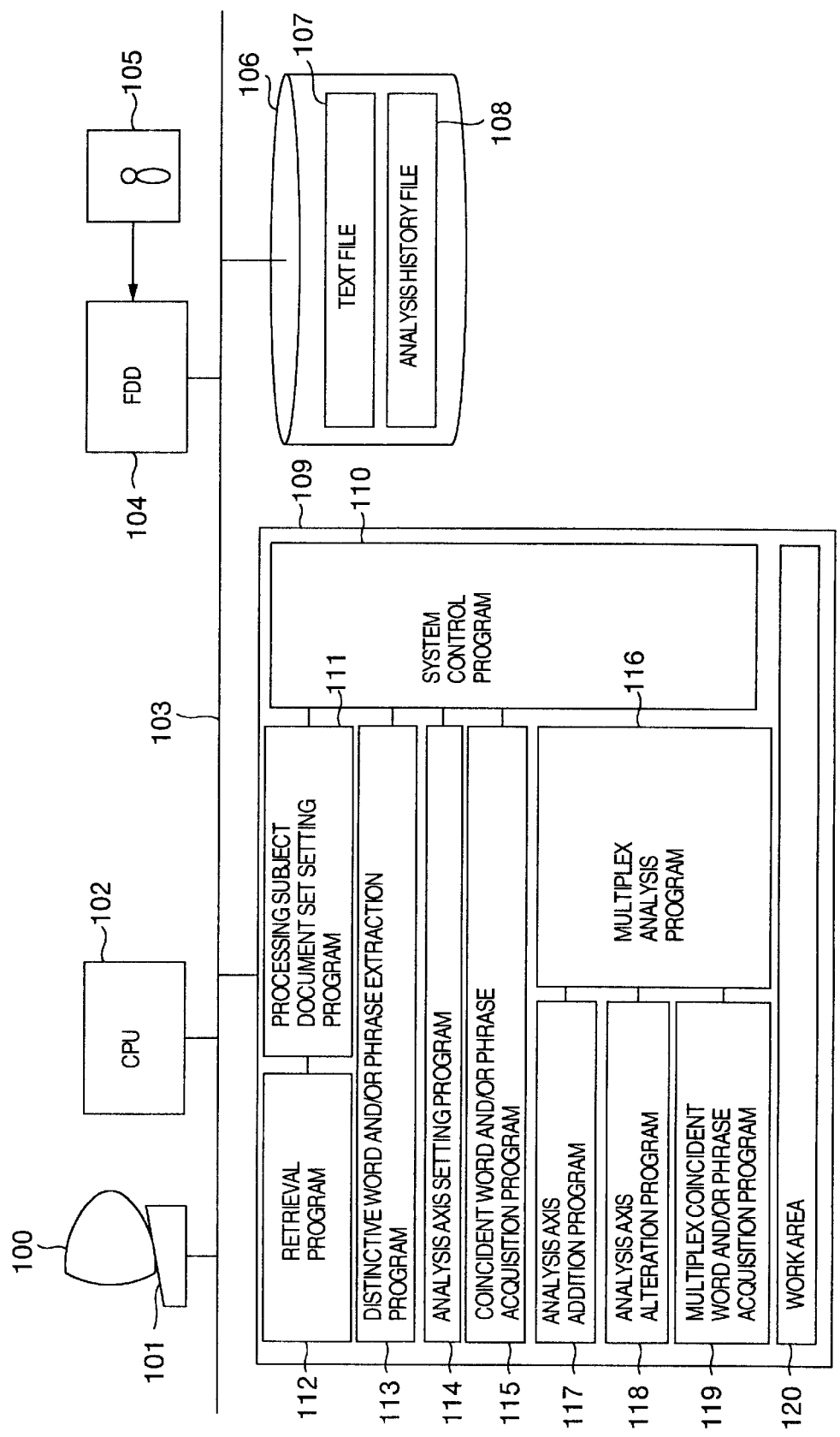
FIG. 1 is a diagram showing the configuration of a first embodiment of the present invention.
Figure 2:
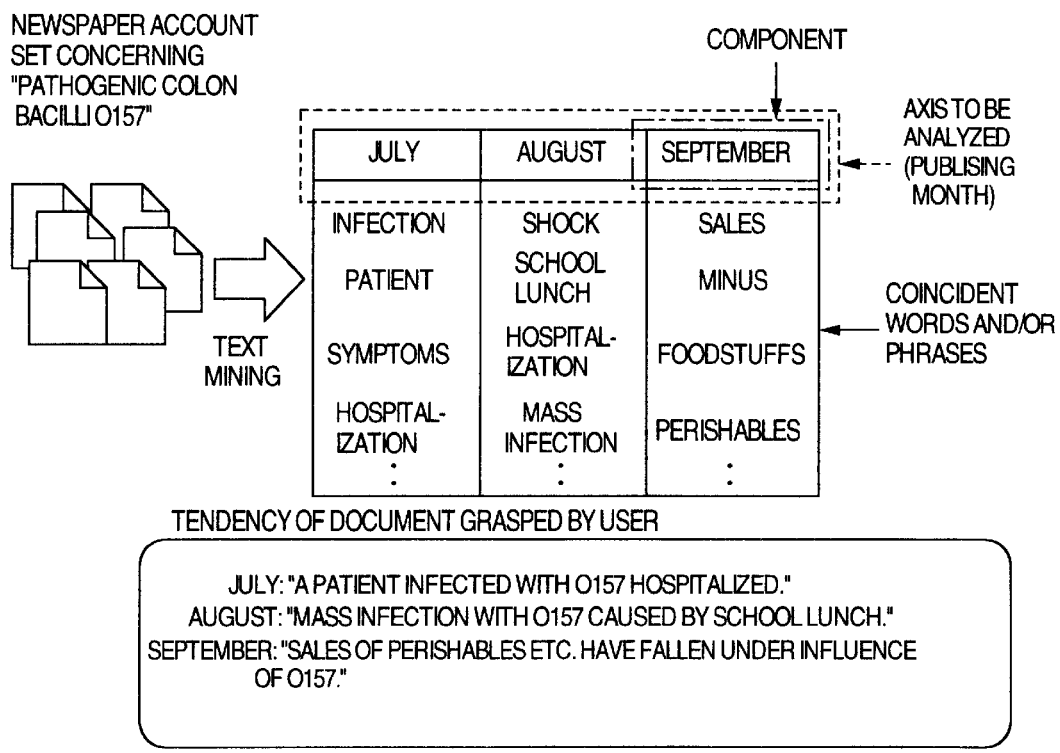
FIG. 2 is a diagram showing processing contents of related art 1.
Figure 3:
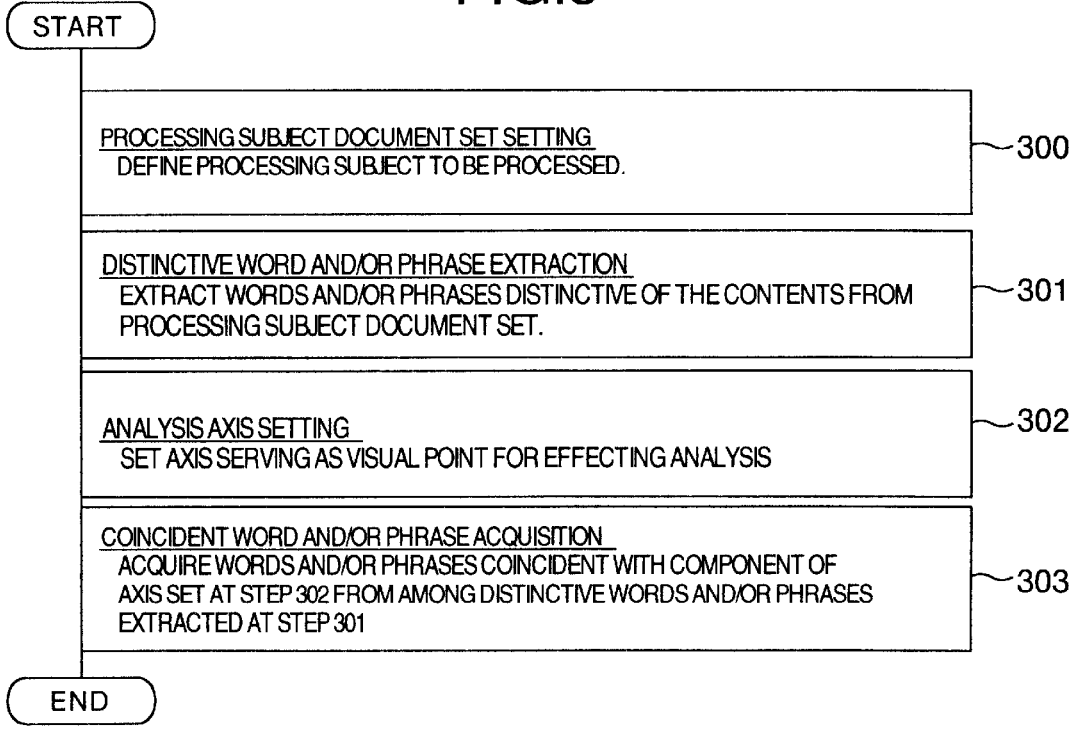
FIG. 3 is a PAD diagram showing processing contents of related art 1.

A configuration of the embodiment of the present invention is shown in FIG. 1.

As shown in FIG. 1, a document processing system includes a display 100, a keyboard 101, a central processing device (CPU) 102, a floppy disk driver (FDD) 104, a magnetic disk device 106, a main storage 109, and a bus 103 for connecting them. The magnetic disk device 106 is one of secondary storages. In the magnetic disk device 106, a text file 107 and an analysis history file 108 are stored. Information stored in a floppy disk 105 is accessed by the FDD 104.

In the main storage 109, there are stored a system control program 110, a processing subject document set setting program 111, a retrieval program 112, a distinctive word and/or phrase extraction program 113, an analysis axis setting program 114, a coincident word and/or phrase acquisition program 115, a multiplex analysis program 116, an analysis axis addition program 117, an analysis axis alteration program 118, and a multiplex coincident word and/or phrase acquisition program 119. In addition, a work area 120 is secured in the main storage 109. It is also possible to store the programs heretofore described in a computer readable storage medium such as the magnetic disk device 106 or the floppy disk 105.

Figure 5:
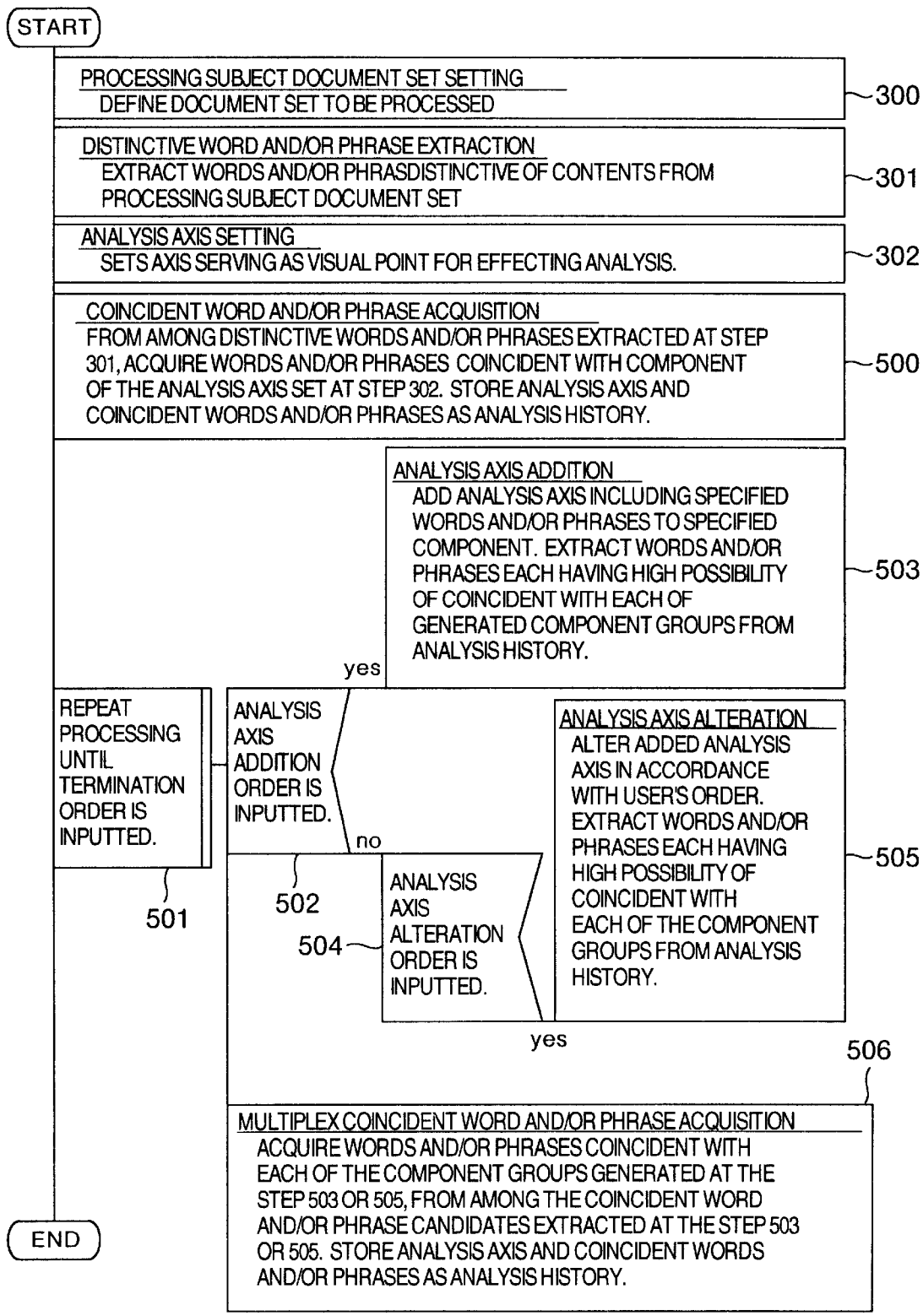
FIG. 5 is a PAD diagram showing processing contents of a first embodiment of the present invention.

Hereafter, processing contents of the embodiment according to the present invention will be described by referring to FIG. 5.

Upon receiving a text mining execution order from the keyboard 101, the system control program 110 is started. The system control program 110 controls the processing subject document set setting program 111, the distinctive word and/or phrase extraction program 113, the analysis axis setting program 114, the coincident word and/or phrase acquisition program 115, and the multiplex analysis program 116.

First, at step 300, the system control program 110 starts the processing subject document set setting program 111, and defines a document set to be processed by the text mining, from out of the text file 107. In the case where the text file 107 is a data base of documents, such as questionnaires, collected on the basis of a certain viewpoint beforehand, it is set as a document set to be processed as it is. In the case where the text file 107 is a data base of documents, such as newspaper accounts, including diverse viewpoints of politics, economy, sports, and so on, full text search or the like is conducted according to the analysis object of the user and the document set is defined. When setting a document set to be processed by using the full text search or the like, the processing subject document set setting program 111 starts the retrieval program 112, defines the text file 107 with a retrieval condition inputted by the user, and makes it a document set to be processed. For the retrieval program 112, the retrieval technique as described in the related art 2 is used. Subsequently, at step 301, the distinctive word and/or phrase extraction program 113 is started. The distinctive word and/or phrase extraction program 113 extracts distinctive words and/or phrases distinctive of he contents from the processing subject document set reset at the step 300. The distinctive words and/or phrases may be extracted by referring to a dictionary, or may be extracted by using statistical information. Subsequently, at step 302, the analysis axis setting program 114 is started, and it sets an axis serving as a visual point for making an analysis. Here, date, age, sex distinction, or the like provided as bibliography information of documents is set as an analysis axis, and specified words and/or phrases are set as components of the analysis axis. For example, in the case where it is desired to know difference of consciousness depending upon the age from questionnaires, the age is set here as the analysis axis.

In this case, numerical values, such as "20" and "30", representing the age become components of the analysis axis. The processing of the steps 300 to 302 is conducted in the same way as the related art 1. Subsequently, at step 500, the coincident word and/or phrase acquisition program 115 is started. From among the distinctive words and/or phrases extracted at the step 301, words and/or phrases coincident in a predetermined range with a component of the analysis axis set at the step 302 are acquired. The analysis axis and the coincident words and/or phrases are stored in the analysis history file 108 as the analysis history. The processing of acquiring the coincident words and/or phrases at the present step is conducted in the same way as the related art 1. And at step 501, the multiplex analysis program 116 is started. Until a text mining termination order is inputted by the user, multiplex analysis processing ranging from step 502 to step 506 is repeated.

First, at step 502 in this multiplex analysis processing, it is determined whether an analysis axis addition order is inputted by the user. If an analysis axis addition order is judged to have been inputted, then at step 503 the analysis axis addition program 117 is started. An analysis axis including the specified words and/or phrases is added to the specified component, and groups formed of the specified component and components of the added analysis axis are generated. In addition, words and/or phrases each having a high possibility of coincidence with each of the generated component groups are extracted from the analysis history file 108 as coincident word and/or phrase candidates. If an analysis axis addition order is judged at the step 502 not to have been inputted, then at step 504 it is determined whether an analysis axis alteration order has been inputted. If an analysis axis alteration order is judged at the step 504 to have been inputted, then at step 505 the analysis axis alteration program 118 is started. The added analysis axis is altered in accordance with the user's order. In addition, words and/or phrases each having a high possibility of coincidence with each of the component groups are extracted from the analysis history file 108 as coincident word and/or phrase candidates. Finally, at step 506, the multiplex coincident word and/or phrase acquisition program 119 is started. Then, from among the coincident word and/or phrase candidates extracted at the step 503 or 505, words and/or phrases coincident in a predetermined range with each of the component groups generated at the step 503 or 505 are acquired. When acquiring the coincident words and/or phrases, the user may be made to specify the range of the coincidence (such as, within the same document, within the same paragraph, within the same sentence, within a specified number of characters, or within a specified number of words). The analysis axis and the coincident words and/or phrases are stored in the analysis history file 108 as the analysis history.

Hereafter, processing contents in the present embodiment will be described concretely along FIG. 5.

Figure 6:
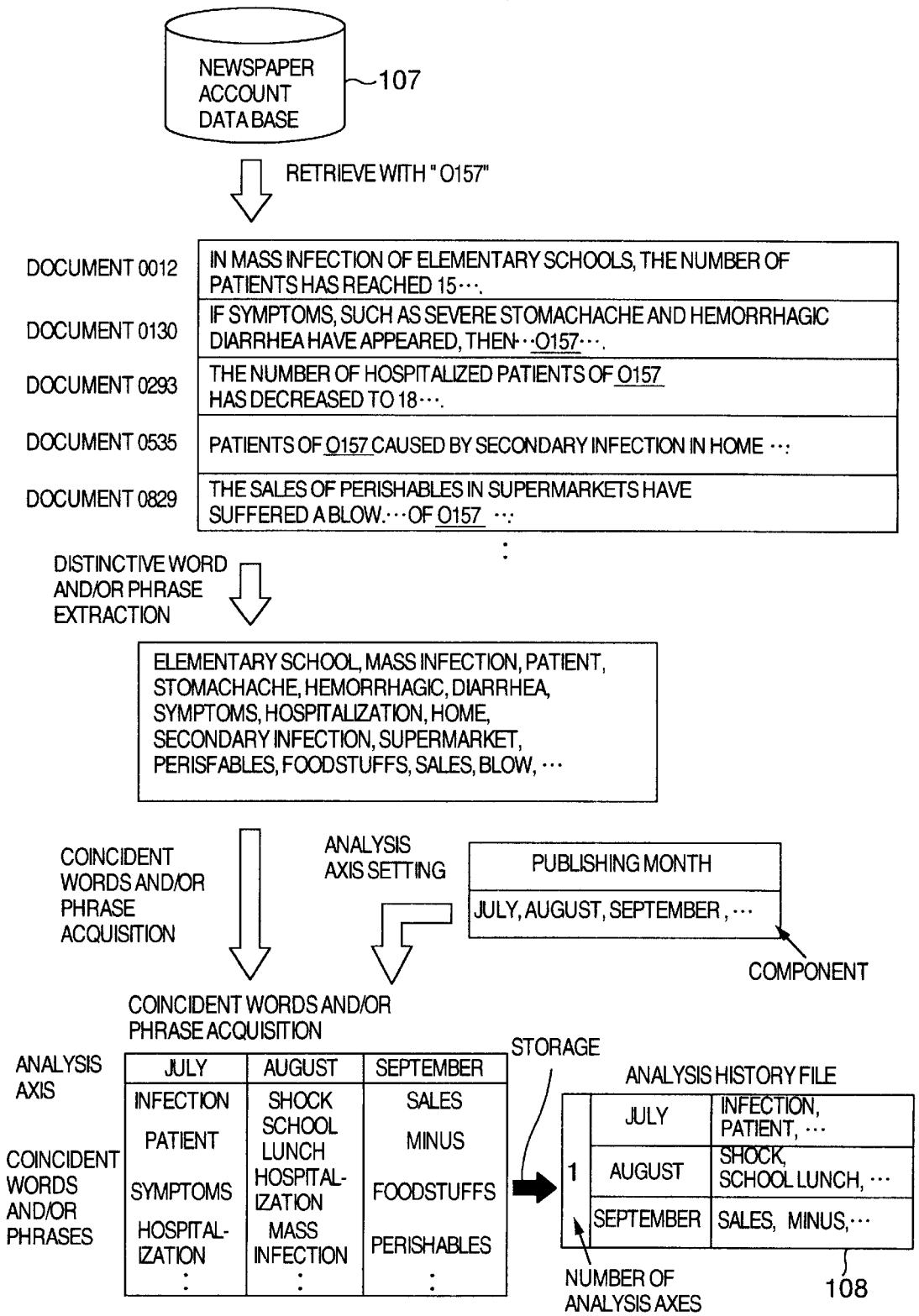
FIG. 6 is a diagram showing contents of processing subject document set setting processing, distinctive word and/or phrase extraction processing, analysis axis setting processing, and coincident word and/or phrase acquisition processing in a first embodiment of the present invention.

First, at step 300, the system control program 110 starts the processing subject document set setting program 111, and defines a document set to be processed by the text mining, from out of the text file 107. In the case where the text file 107 is a data base of documents, such as questionnaires, collected on the basis of a certain viewpoint beforehand, it is set as a document set to be processed as it is. In the case where the text file 107 is a data base of documents, such as newspaper accounts, including diverse viewpoints of politics, economy, sports, and so on, full text search or the like is conducted according to the analysis object of the user and the document set is defined. When setting a document set to be processed by using the full text research or the like, the processing subject document set setting program 111 starts the retrieval program 112, defines the text file 107 with a retrieval condition inputted by the user, and makes it a document set to be processed. For the retrieval program 112, the retrieval technique as described in the related art 2 is used. FIG. 6 shows an example of the case where accounts relating to "O157" in a newspaper data base are subjected to text mining. In the example shown in FIG. 6, the newspaper data base is stored in the text file 107. Therefore, the present data base is restricted to accounts including "O157" by using the retrieval program 112. As a document set to be processed, a document 0012, a document 0130, a document 0293, a document 0535, a document 0829, . . . are obtained. Subsequently, at step 301, the distinctive word and/or phrase extraction program 113 is started. The distinctive word and/or phrase extraction program 113 extracts distinctive words and/or phrases distinctive of the contents from the processing subject document set preset at the step 300. The distinctive words and/or phrases may be extracted by referring to a dictionary, or may be extracted by using statistical information. In the example shown in FIG. 6, "Elementary school, mass infection, patient, stomachache, hemorrhagic, diarrhea, symptoms, hospitalization, home, secondary infection, supermarket, perishables, foodstuffs, sales, blow, . . . " are extracted from the processing subject document set preset at the step 300 as distinctive words and/or phrases. Subsequently, at step 302, the analysis axis setting program 114 is started, and it sets an axis serving as a visual point for making an analysis. Here, date, age, sex distinction, or the like provided as bibliography information of documents is set as an analysis axis, and specified words and/or phrases are set as components of the analysis axis. In the example shown in FIG. 6, the publishing month provided as bibliography information of newspaper accounts is set as an analysis axis. The processing of the steps 300 to 302 is conducted in the same way as the related art 1. Subsequently, at step 500, the coincident word and/or phrase acquisition program 115 is started. From among the distinctive words and/or phrases extracted at the step 301, words and/or phrases coincident in a predetermined range with a component of the analysis axis set at the step 302 are acquired. The analysis axis and the coincident words and/or phrases are stored in the analysis history file 108 as the analysis history. By executing the present processing, in the example of FIG. 6, coincident words and/or phrases "infection, patient, symptoms, hospitalization, . . . " are acquired in association with "July" which is a component of the analysis axis. Coincident words and/or phrases "shock, school lunch, hospitalization, mass infection, . . . " are acquired in association with "August". Coincident words and/or phrases "sales, minus, foodstuffs, perishables, . . . " are acquired in association with "September". This result is stored in the analysis history file 108 as an analysis result using one analysis axis. The processing of acquiring the coincident words and/or phrases at the present step is conducted in the same way as the related art 1.

And at step 501, the multiplex analysis program 116 is started. Until a text mining termination order is inputted by the user, multiplex analysis processing ranging from step 502 to step 506 is repeated. Hereafter, the multiplex analysis processing will be described by dividing it into the case where an analysis axis is added and the case where an analysis axis is altered.

Figure 7:
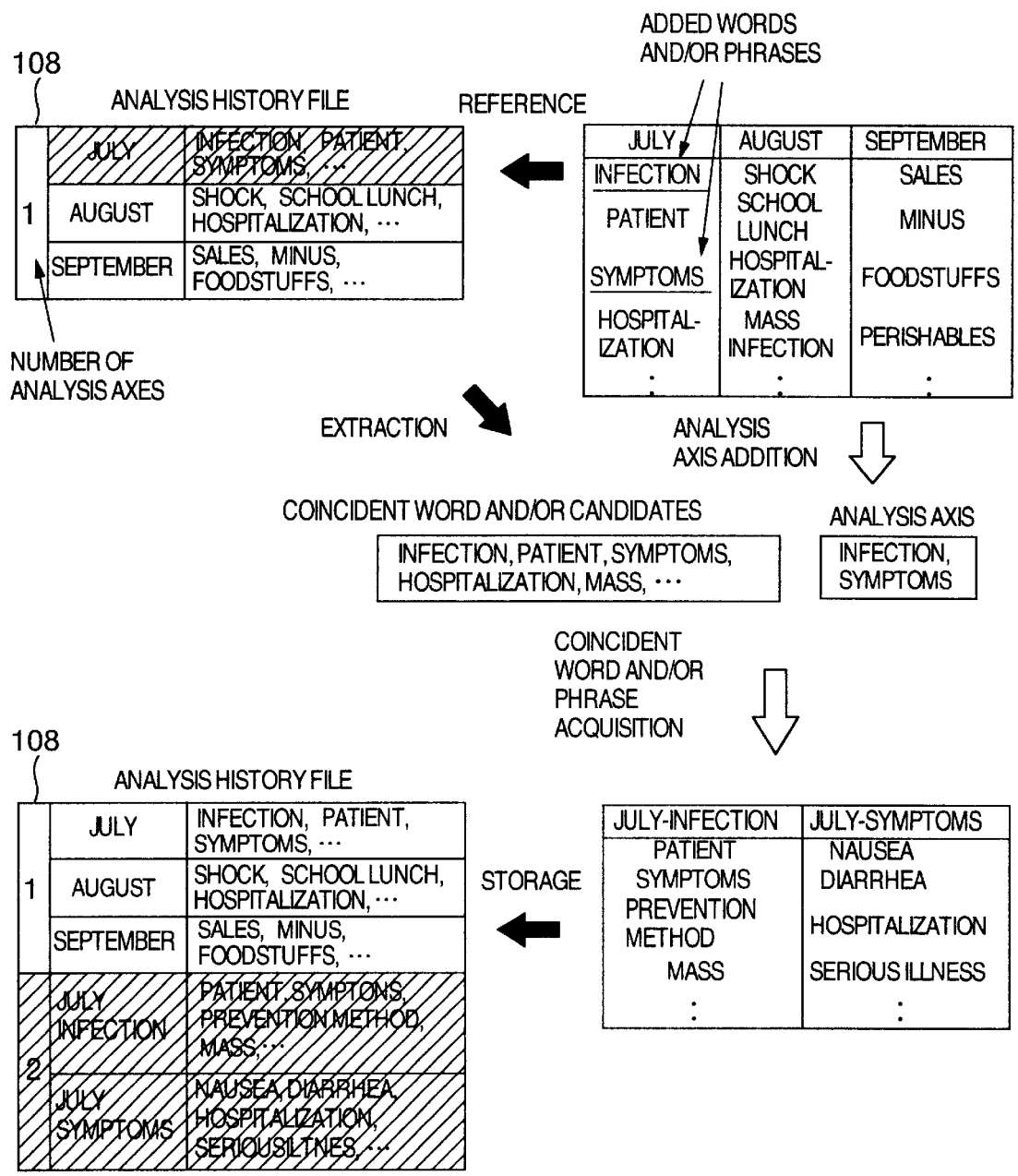
FIG. 7 is a diagram showing contents of analysis axis addition processing in a first embodiment of the present invention.

In the case where an analysis axis is added, first, an analysis axis addition order is judged at step 502 to have been inputted. An analysis axis including the specified words and/or phrases is added to the specified component, and groups formed of the specified component and components of the added analysis axis are generated. In addition, words and/or phrases each having a high possibility of coincidence with each of the generated component groups are extracted from the analysis history file 108 as coincident word and/or phrase candidates. An example of the present processing is shown in FIG. 7. In the example shown in FIG. 7, an analysis axis including words and/or phrases "infection" and "symptoms" acquired in association with a component "July" is added. Accordingly, "infection" and "symptoms" are added to the specified component "July" as an analysis axis. Thus, component groups "July—infection" and "July—symptoms" are generated. Here, "July—infection" means a group of "July" and "infection". As coincident word and/or phrase candidates each having a high possibility of coincidence with each of the component groups "July—infection" and "July—symptoms", words and/or phrases "infection, patient, symptoms, hospitalization, mass, . . . " coincident with "July" are acquired from the analysis history file 108. Finally, at step 506, the multiplex coincident word and/or phrase acquisition program 119 is started. Then, from among the coincident word and/or phrase candidates extracted at the step 503, words and/or phrases coincident in a predetermined range with each of the component groups generated at the step 503 are acquired. When acquiring the coincidence relations, the user may be made to specify the range of the coincidence (such as, within the same document, within the same paragraph, within the same sentence, within a specified number of characters, or within a specified number of words). The analysis axis and the coincident words and/or phrases are stored in the analysis history file 108 as the analysis history. In the example shown in FIG. 7, there are examined coincidence relations between the analysis axes "July—infection" and "July—symptoms" generated at the step 503 and the coincident word and/or phrase candidates extracted from the analysis history file 108 at the same step 503. As a result, "patient, symptoms, prevention method, mass, . . . " are obtained as words and/or phrases coincident with "July—infection". As words and/or phrases coincident with "July—symptoms", "nausea, diarrhea, hospitalization, serious illness, . . . " are obtained. Coincident in a predetermined range with 'July—infection'" means "coincident in a predetermined range with 'July'" and "coincident in a predetermined range with 'infection'". The analysis axis and the coincident words and/or phrases are stored in the analysis history file 108 as a result of an analysis made by using two analysis axes.

Figure 8:
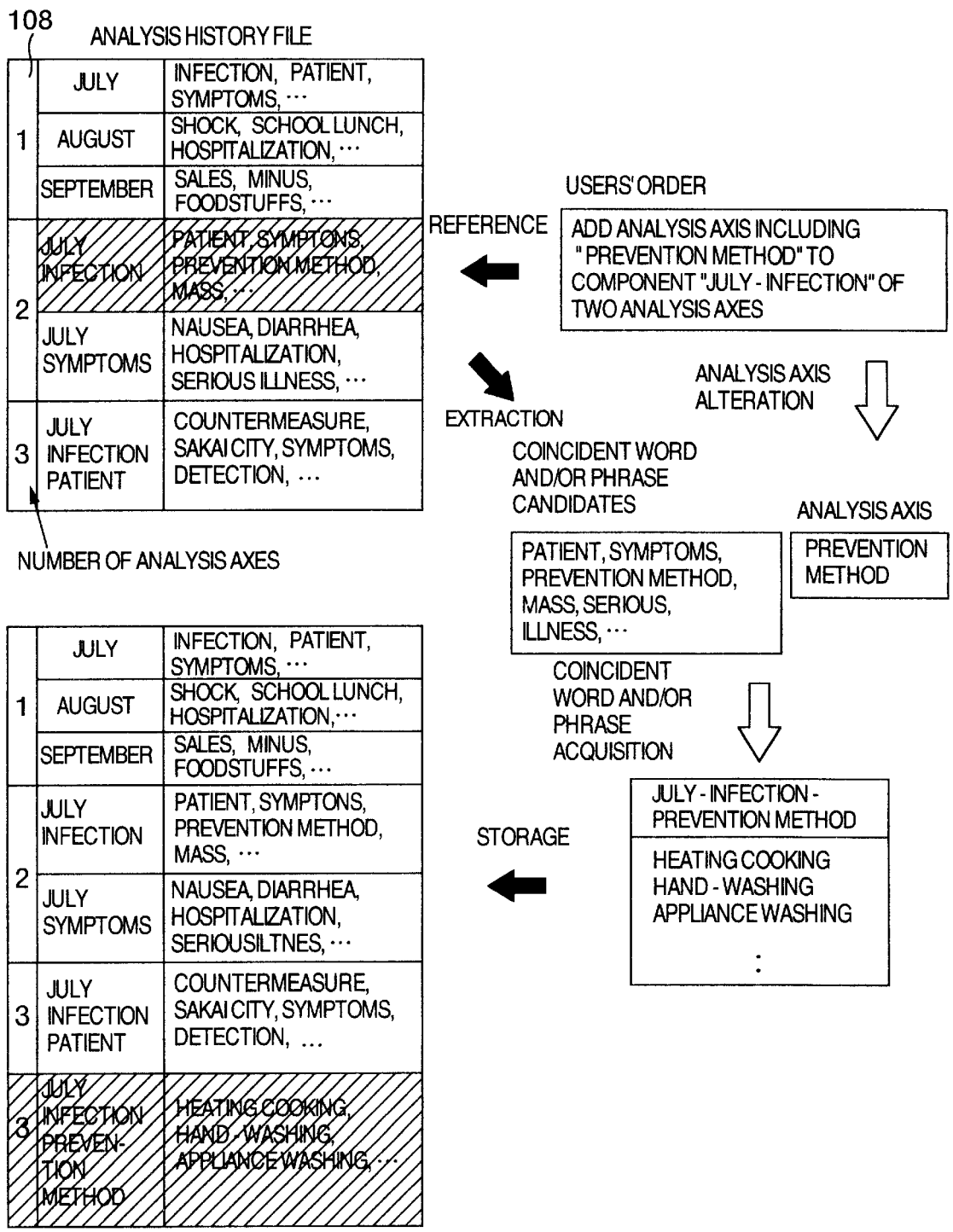
FIG. 8 is a diagram showing contents of analysis axis alteration processing in a first embodiment of the present invention.

In the case where an analysis axis is altered, an analysis axis addition order is judged at the step 502 not to have been inputted, and then an analysis axis alteration order is judged at step 504 to have been inputted. At step 505, the analysis axis alteration program 118 is started. The added analysis axis is altered in accordance with the user's order. In addition, words and/or phrases each having a high possibility of coincidence with each of the component groups are extracted from the analysis history file 108 as coincident word and/or phrase candidates. An example of the present processing is shown in FIG. 8. In the example shown in FIG. 8, the user ceases to delve into an analysis with the visual point, in such a stage that an analysis has been made by using three analysis axes. Then the user makes an alteration so as to add an analysis axis including "prevention method" instead of "patient" to a component "July—infection" of two analysis axes. Thus an analysis is made with a different visual point. In the present processing, an order from the user is received. First, there is added an analysis axis including a phrase "prevention method" coincident with the component "July—infection" of two analysis axes. And there is generated a group "July—infection—prevention method" formed of the specified component "July—infection" and a component of the added analysis axis. And as coincident word and/or phrase candidates each having a high possibility of coincident with the component group "July—infection—prevention method", "patient, symptoms, prevention method, mass, serious illness, . . . " are extracted from the analysis history file 108. Finally, at step 506, the multiplex coincident word and/or phrase acquisition program 119 is started. Then, from among the coincident word and/or phrase candidates extracted at the step 505, words and/or phrases coincident in a predetermined range with the component group generated at the step 505 are acquired. When acquiring the coincident relations, the user may be made to specify the range of the coincidence (such as, within the same document, within the same paragraph, within the same sentence, within a specified number of characters, or within a specified number of words). The analysis axis and the coincident words and/or phrases are stored in the analysis history file 108 as the analysis history. In the example shown in FIG. 8, there are examined coincidence relations between the component group "July—infection—prevention method" generated at the step 505 and the coincident word and/or phrase candidates extracted from the analysis history file 108 at the same step 505. As a result, "heating cooking, hand-washing, appliance washing, . . . " are obtained as words and/or phrases coincident with "July—infection—prevention method". The analysis axis and the coincident words and/or phrases are stored in the analysis history file 108 as a result of an analysis made by using three analysis axes.

Heretofore, the processing contents in the present embodiment have been described in detail.

As heretofore described, in a method shown in the present embodiment, the analysis axis and the analysis result are preserved as the analysis history. In addition, a different analysis axis is added to a specified component of the analysis axis. Words and/or phrases coincident with each of groups formed of the specified component and components of the added analysis axis are acquired. Furthermore, when an analysis axis has been added to the specified component or the added analysis axis has been changed, words and/or phrases each having a high possibility of coincidence with each of groups formed of components of a plurality of analysis axes are extracted from the analysis history as coincident word and/or phrase candidates, and words and/or phrases coincident with each of groups formed of the specified component and components of the added analysis axis are acquired from among the coincident word and/or phrase candidates. In this way, coincident words and/or phrases are narrowed down by using the analysis history, and then words and/or phrases actually coincident with each of the components are examined. As compared with the case where it is determined whether all distinctive words and/or phrases coincide, therefore, a fast analysis can be made. By doing so, a text mining function capable of interactively making an analysis from a wide variety of visual points can be implemented. Therefore, it becomes possible to provide a document processing system whereby the user can analyze the tendency of the document set suitably and easily.

The present embodiment has been described by taking the case where a document set to be processed is defined by using full text search with a word specified, as an example. However, similar processing is also possible in the case where the whole document set stored in the data base is made the document set to be processed, and the case where a result of retrieval conducted by using a sentence or a document as a retrieval condition is made the document set to be processed.

Furthermore, the present embodiment has been described by taking the case where an analysis axis having a coincident word or phrase obtained as an analysis result, as a component is added, as an example. However, even in the case where an analysis axis having a specified arbitrary word or phrase as a component is added or specified arbitrary bibliography information is added as an analysis axis, similar processing is also possible by specifying a component to which the analysis axis is to be added.

Figure 9:
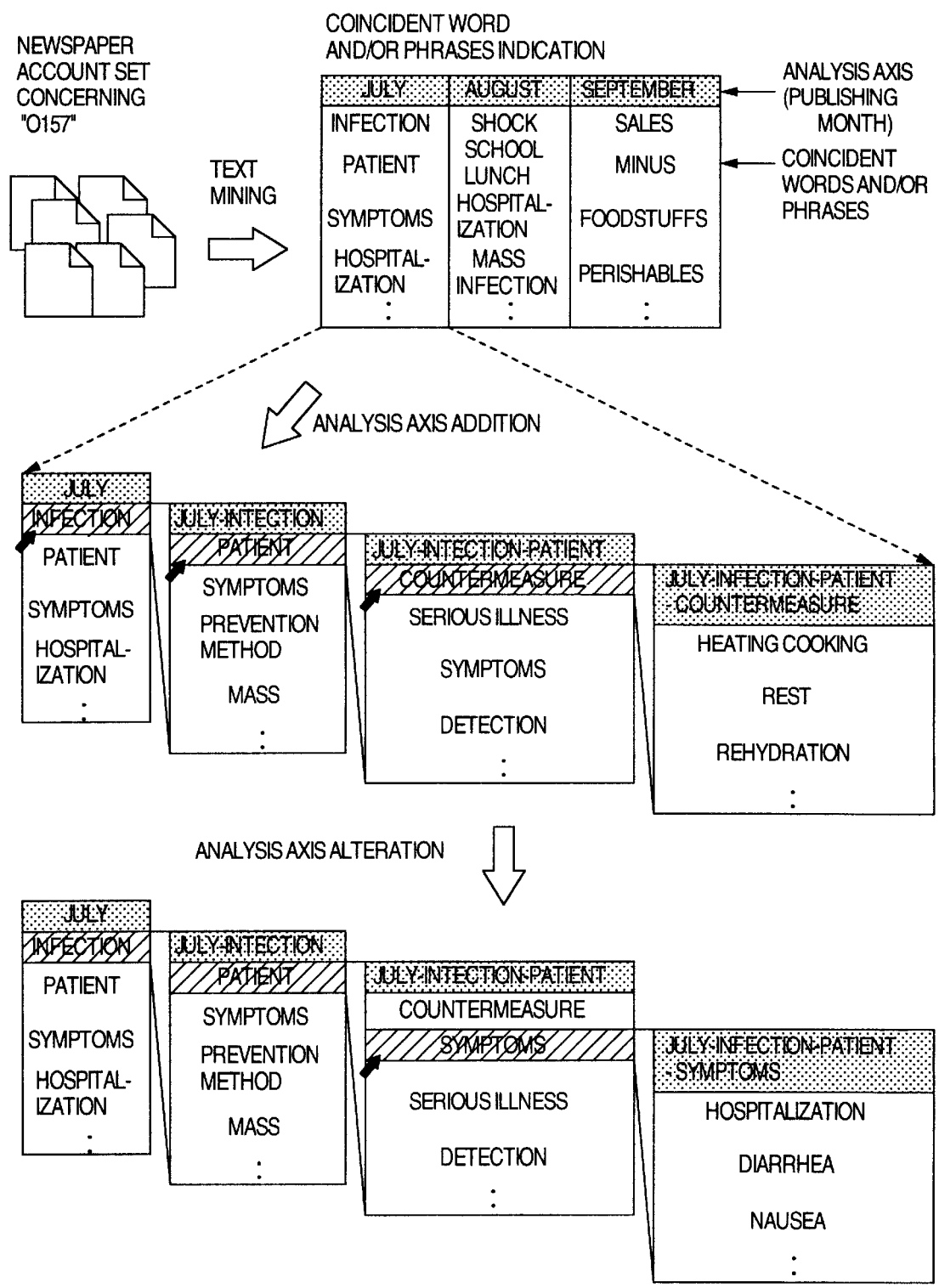
FIG. 9 is a diagram showing processing contents of a second embodiment of the present invention.

The principle of a second embodiment of the present invention will now be described by referring to FIG. 9.

The present embodiment is such a method that the user selects from among displayed words and/or phrases a word and/or phrase to be added as an analysis axis, and thereby an analysis axis including the pertinent word or phrase is added to a corresponding component, and a result of text mining using the added analysis axis is displayed. Furthermore, in the case where a coincident word or phrase added as an analysis axis in the past is altered to a different coincident word or phrase, the present embodiment is such a method that the user reselects a coincident word or phrase to be altered, and thereby a component of the pertinent analysis axis is altered to a selected word or phrase, and a result of text mining using the analysis axis after alteration is displayed.

In the case where a text mining execution order is inputted by the user, a specified document set to be processed is analyzed by using a preset analysis axis, and a coincident word or phrase is displayed in association with a component of the analysis axis. In the example shown in FIG. 9, coincident words and/or phrases are displayed by taking a set of newspaper accounts concerning "O157" as a document set to be processed and taking "publishing month" as an analysis axis. From among the displayed coincident words and/or phrases, the user selects a word or phrase to be added as an analysis axis. As a result, an analysis axis including the pertinent word or phrase is added to a corresponding component. A result of text mining using the analysis axis after addition is displayed. In the example shown in FIG. 9, "infection" is selected from among words and/or phrases displayed as coincident words and/or phrases of "July". Therefore, an analysis axis including "infection" is added to the corresponding component "July". Words and/or phrases coincident with a group "July—infection" formed of the component "July" and a component of the added analysis axis are displayed. Furthermore, if "patient" is selected from among displayed coincident words and/or phrases, then an analysis axis including "patient" is added to a corresponding component "July—infection". Words and/or phrases coincident with a group "July—infection—patient" formed of the component "July—infection" and a component of the added analysis axis are displayed. In addition, if "countermeasure" is selected from among the displayed coincident words and/or phrases, then an analysis axis including "countermeasure" is added to a corresponding component "July—infection—patient". Words and/or phrases coincident with a group "July—infection—patient—countermeasure" formed of the component "July—infection—patient" and the component of the added analysis axis are displayed. Furthermore, if the user desires to alter "countermeasure" added to the component "July—infection—patient" to "symptoms", then the user selects "symptoms" from among coincident words and/or phrases of "July—infection—patient" displayed in the past. As a result, an analysis axis including "symptoms" is added to the corresponding component "July—infection—patient".

Words and/or phrases coincident with a group "July—infection—patient—symptoms" formed of the component "July—infection—patient" and the component of the added analysis axis are displayed. By the way, when displaying the coincident words and/or phrases, they may be displayed either on the same picture as the coincident words and/or phrases displayed in the past, or on a newly generated picture. Furthermore, the past coincident word and/or phrase display picture may be erased according to an order from the user.

As heretofore described, according to the text mining result display method in the present embodiment, there is implemented a text mining function whereby an analysis axis can be altered interactively and analysis from a wide variety of visual points can be effected easily. By doing so, it becomes possible to provide a document processing system whereby the user can analyze the tendency of the document set suitably and easily.

Figure 10:
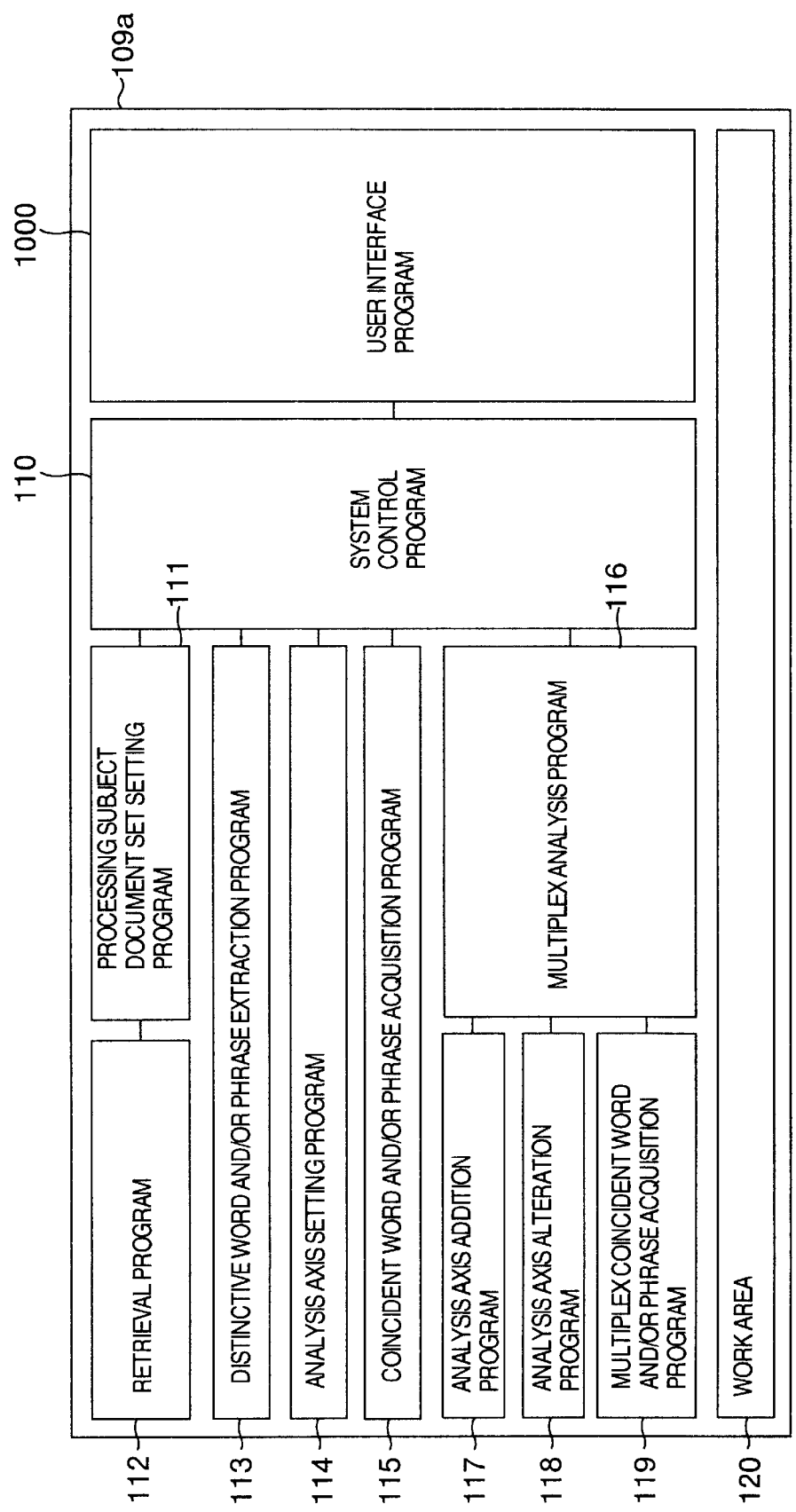
FIG. 10 is a diagram showing the configuration of programs stored in a main storage device 109a in a second embodiment of the present invention.

The present embodiment has basically the same configuration as the first embodiment (FIG. 1). However, the present embodiment differs from the first embodiment in configuration of programs stored in the main storage 109. As shown in FIG. 10, there are stored in the main storage 109a, a user interface program 1000, a system control program 110, a processing subject document set setting program 111, a retrieval program 112, a distinctive word and/or phrase extraction program 113, an analysis axis setting program 114, a coincident word and/or phrase acquisition program 115, a multiplex analysis program 116, an analysis axis addition program 117, an analysis axis alteration program 118, and a multiplex coincident word and/or phrase acquisition program 119. In addition, a work area 120 is secured in the main storage 109a. It is also possible to store the programs heretofore described in a computer readable storage medium such as the magnetic disk device 106 or the floppy disk 105.

Figure 11:
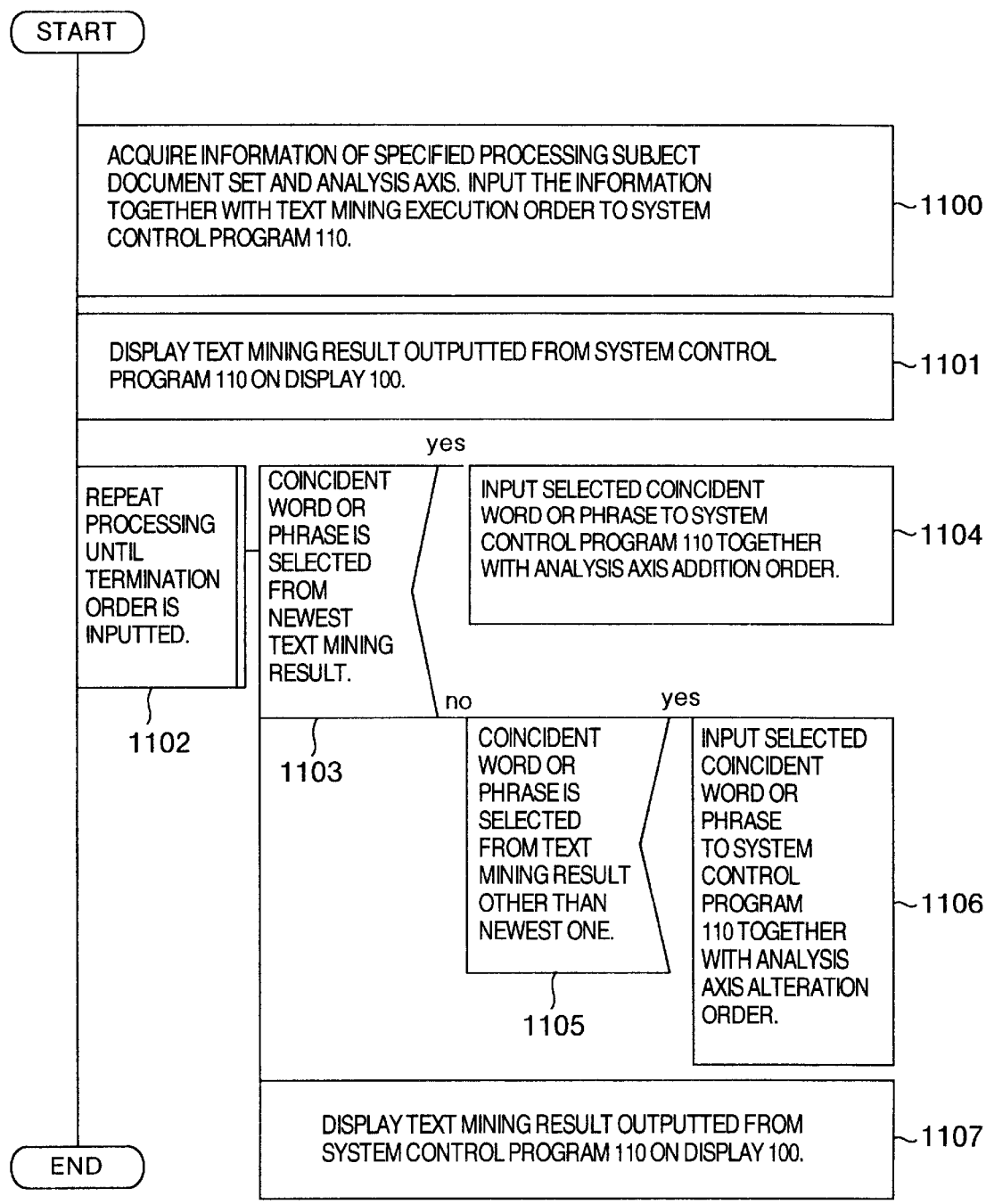
FIG. 11 is a PAD diagram showing processing contents of a second embodiment of the present invention.

Hereafter, the processing contents of the user interface program 1000 peculiar to the second embodiment will be described by referring to FIG. 11.

The user interface program 1000 is started by a text mining execution order received from the keyboard 101.

First, at step 1100, the user interface program 1000 acquires information of the processing subject document set and analysis axis specified by the user, and inputs the information together with a text mining execution order to the system control program 110. At step 1101, the user interface program 1000 displays a text mining result outputted from the system control program 110 on the display 100. Subsequently, at step 1102, the user interface program 1000 repeats the processing of steps 1103 to 1107 until the user inputs a termination order.

In this repetitive processing, it is first determined at the step 1103 whether a coincident word or phrase has been selected from the newest text mining result. If a coincident word or phrase is judged to have been selected from the newest text mining result, then the selected coincident word or phrase is inputted to the system control program 110 together with the analysis axis addition order at step 1104. If a coincident word or phrase is judged at the step 1103 to have not been selected from the newest text mining result, then it is determined at step 1105 whether a coincident word or phrase has been selected from a text mining result other than the newest one. If a coincident word or phrase is judged to have been selected from a text mining result other than the newest one, then the selected coincident word or phrase is inputted to the system control program 110 together with an analysis axis alteration order at step 1106. Finally at step 1107, the text mining result outputted from the system control program 110 is displayed on the display 100. When displaying the text mining result, it may be displayed either on the same picture as the past text mining result, or on a newly generated picture. Furthermore, the past text mining result may be erased according to an order from the user.

Hereafter, processing contents of the user interface program 1000 will be described concretely along FIG. 11.

First, at step 1100, the user interface program 1000 acquires information of the processing subject document set and analysis axis specified by the user, and inputs the information together with a text mining execution order to the system control program 110. At step 1101, the user interface program 1000 displays a text mining result outputted from the system control program 110 on the display 100. An example of a text mining result displayed as a result of the present processing is shown in FIG. 9. In the example shown in FIG. 9, a set of newspaper accounts concerning "O157" is taken as a document set to be processed and "publishing month" is taken as an analysis axis. The user gives the information of the processing subject document set and analysis axis together with the text mining execution order to the user interface program 1000. As a result, the information is inputted to the system control program 110. The text mining result outputted by the system control program 110 is displayed on the display 100. Subsequently, at step 1102, the processing of steps 1103 to 1107 is repeated until the user inputs a termination order.

Hereafter, the repetitive processing will be described by dividing it into the case where an analysis axis is added and the case where an analysis axis is altered.

In the case where an analysis axis is added, the user selects a coincident word or phrase to be added from the newest text mining result. As a result, the user interface program 1000 judges at the step 1103 a coincident word or phrase to have been selected from the newest text mining result. At step 1104, the user interface program 1000 inputs the selected coincident word or phrase to the system control program 110 together with an analysis axis addition order. Finally at step 1107, the text mining result outputted from the system control program 110 is displayed on the display 100. In the example shown in FIG. 9, "infection" is selected from among words and/or phrases displayed as coincident words and/or phrases of "July". As a result, the user interface program 1000 inputs the "infection" and an analysis axis addition order to the system control program 110. The user interface program 1000 displays its output result, i.e., a text mining result obtained when an analysis axis including "infection" is added to the corresponding component "July". In addition, if "patient" is selected from out of the displayed result, then the user interface program 1000 inputs the "patient" and an analysis axis addition order to the system control program 110. The user interface program 1000 displays its output result, i.e., a text mining result obtained when an analysis axis including "patient" is added to the corresponding component "July—infection". In addition, if "countermeasure" is selected from out of the displayed result, then the user interface program 1000 inputs the "countermeasure" and an analysis axis addition order to the system control program 110. Its output result, i.e., a text mining result obtained when an analysis axis including "countermeasure" is added to the corresponding component "July—infection—patient" is displayed on the display 100.

In the case where an analysis axis is altered, the user reselects a coincident word or phrase from out of the text mining result other than the newest one. As a result, the user interface program 1000 judges at the step 1103 a coincident word or phrase to have not been selected from the newest text mining result. At step 1105, the user interface program 1000 judges a coincident word or phrase to have been selected from the text mining result other than the newest one. At step 1106, the user interface program 1000 inputs the selected coincident word or phrase to the system control program 110 together with an analysis axis alteration order. Finally at step 1107, the text mining result outputted from the system control program 110 is displayed on the display 100. In the example shown in FIG. 9, "countermeasure" added to the component "July—infection—patient" is altered to "symptoms". The user reselects "symptoms" from among the coincident words and/or phrases of "July—infection—patient" displayed in the past. As a result, the user interface program 1000 inputs the "symptoms" and an analysis axis alteration order to the system control program 110. The user interface program 1000 displays its output result, i.e., a text mining result obtained when an analysis axis including "symptoms" is added to the corresponding component "July—infection—patient" on the display 100. When displaying the text mining result, it may be displayed either on the same picture as the past text mining result, or on a newly generated picture. Furthermore, the past text mining result may be erased according to an order from the user.

Heretofore, the processing contents in the present embodiment have been described in detail.

As heretofore described, according to the text mining result display method in the present embodiment, there is implemented a text mining function whereby an analysis axis can be altered interactively and analysis from a wide variety of visual points can be effected easily. By doing so, it becomes possible to provide a document processing system whereby the user can analyze the tendency of the document set suitably and easily.

The principle of a third embodiment of the present invention will now be described.

The present embodiment is a method of supporting a user in grasping the tendency of a document set by acquiring a typical document closely related to a coincident word or phrase specified by the user and a corresponding component.

If a typical document acquisition order is inputted by the user together with a coincident word or phrase specified from out of a text mining result, then retrieval of a document set which has become the subject of text mining is conducted by using the specified coincident word or phrase and words and/or phrases included in a component corresponding to the specified coincident word or phrase. A document having a high score, the newest document, a document having specified bibliography information, or the like is acquired as a typical document. A plurality of coincident words and/or phrases may be specified.

Figure 12:
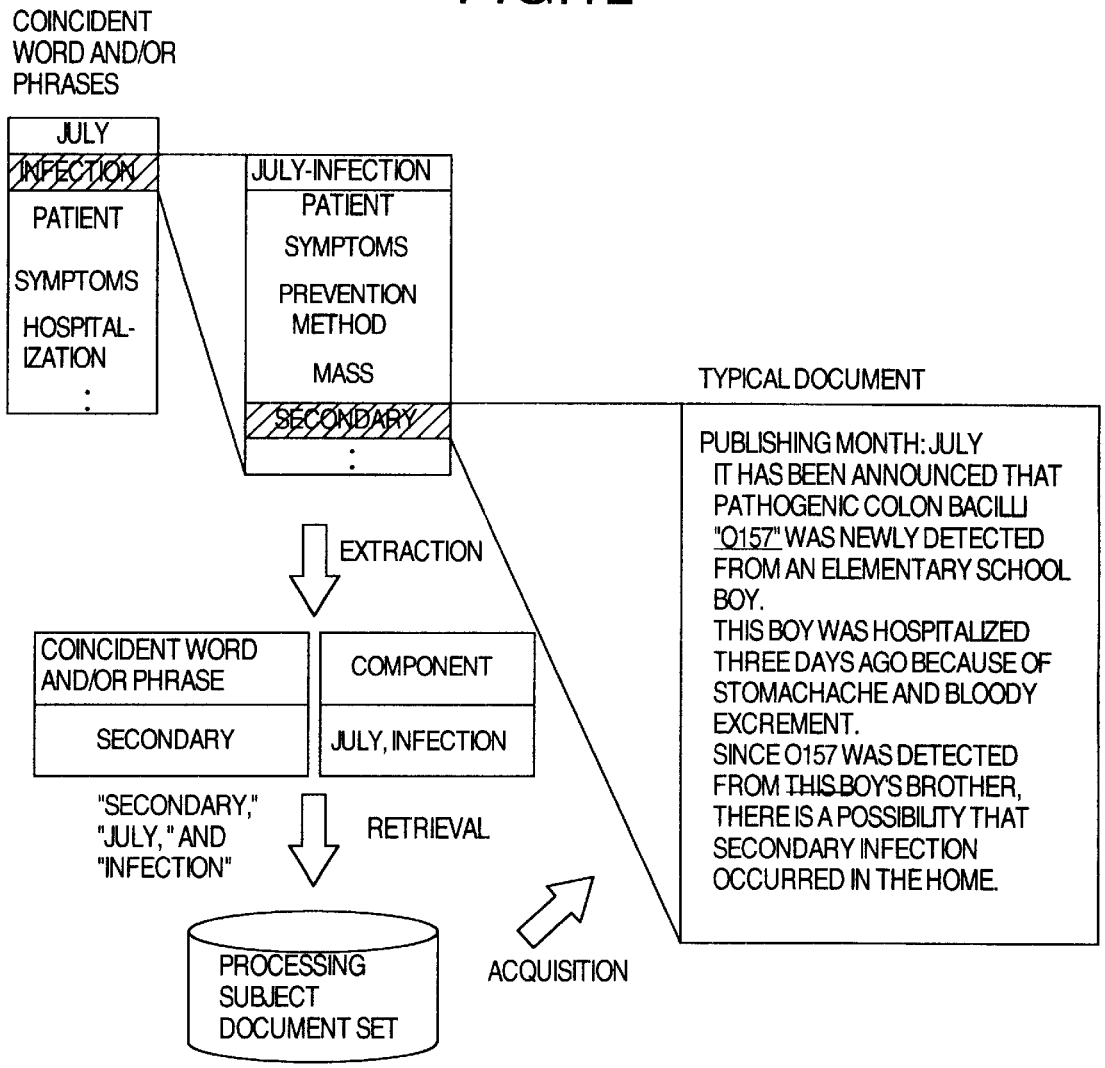
FIG. 12 is a diagram showing processing contents of a third embodiment of the present invention.

In an example shown in FIG. 12, "secondary" is selected from among words and/or phrases coincident with a component "July—infection". If a typical document acquisition order is inputted, a specified word or phrase, and words and/or phrases included in a component corresponding to the specified coincident word or phrase are extracted. By using those words and/or phrases, retrieval is effected on a document set to be processed. In the example shown in FIG. 12, the specified coincident word "secondary" and words "July" and "infection" included in the corresponding component are extracted. Documents including these words are retrieved from out of the document set to be processed. In the retrieval condition used here, all words are treated with the same weights. However, the retrieval words and/or phrases may be provided with weights according to the addition order of analysis axes. As a result of this retrieval, a document having a high score, the newest document, a document having specified bibliography information, or the like is acquired as a typical document. In the example shown in FIG. 12, the following document is acquired as a typical document. "Publishing month: July. "It is announced that pathogenic colon bacilli 'O157' has been newly detected from an elementary school boy. This boy was hospitalized three days ago because of stomachache and bloody excrement. Since O157 was detected from this boy's brother, there is a possibility of secondary infection in the home".

As heretofore described, according to the method in the present embodiment, a typical document closely related to a specified word or phrase and a corresponding component is acquired. It becomes possible to provide such a document processing system that the user can analyze the tendency of the document set suitably and easily by perusing the typical document.

Figure 13:
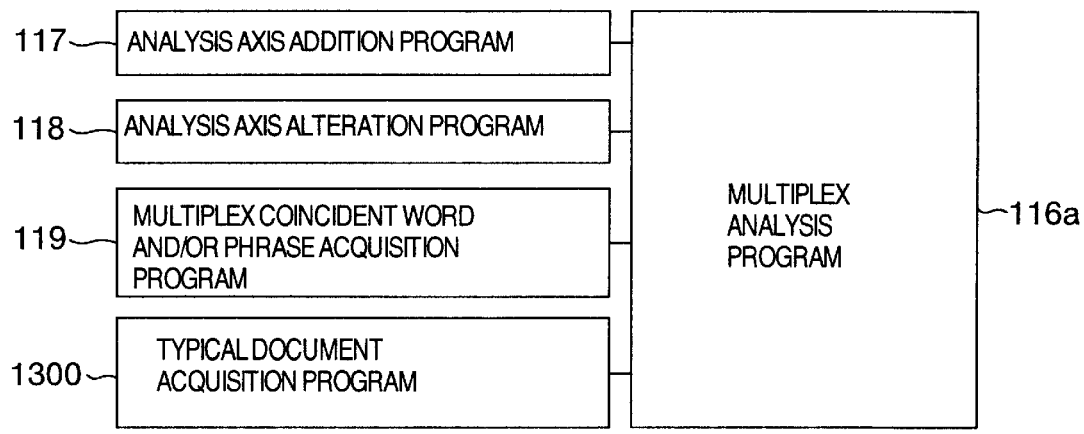
FIG. 13 is a diagram showing the configuration of programs controlled by a multiplex analysis program 116a in a third embodiment of the present invention.

The present embodiment has basically the same configuration as the first embodiment (FIG. 1). However, the present embodiment differs from the first embodiment in the program configuration under the multiplex analysis program 116. Program configuration under a multiplex analysis program 116a is shown in FIG. 13. As shown in FIG. 13, an analysis axis addition program 117, an analysis axis alteration program 118, a multiplex coincident word and/or phrase acquisition program 119, and a typical document acquisition program 1300 are stored under the multiplex analysis program 116a.

Figure 14:
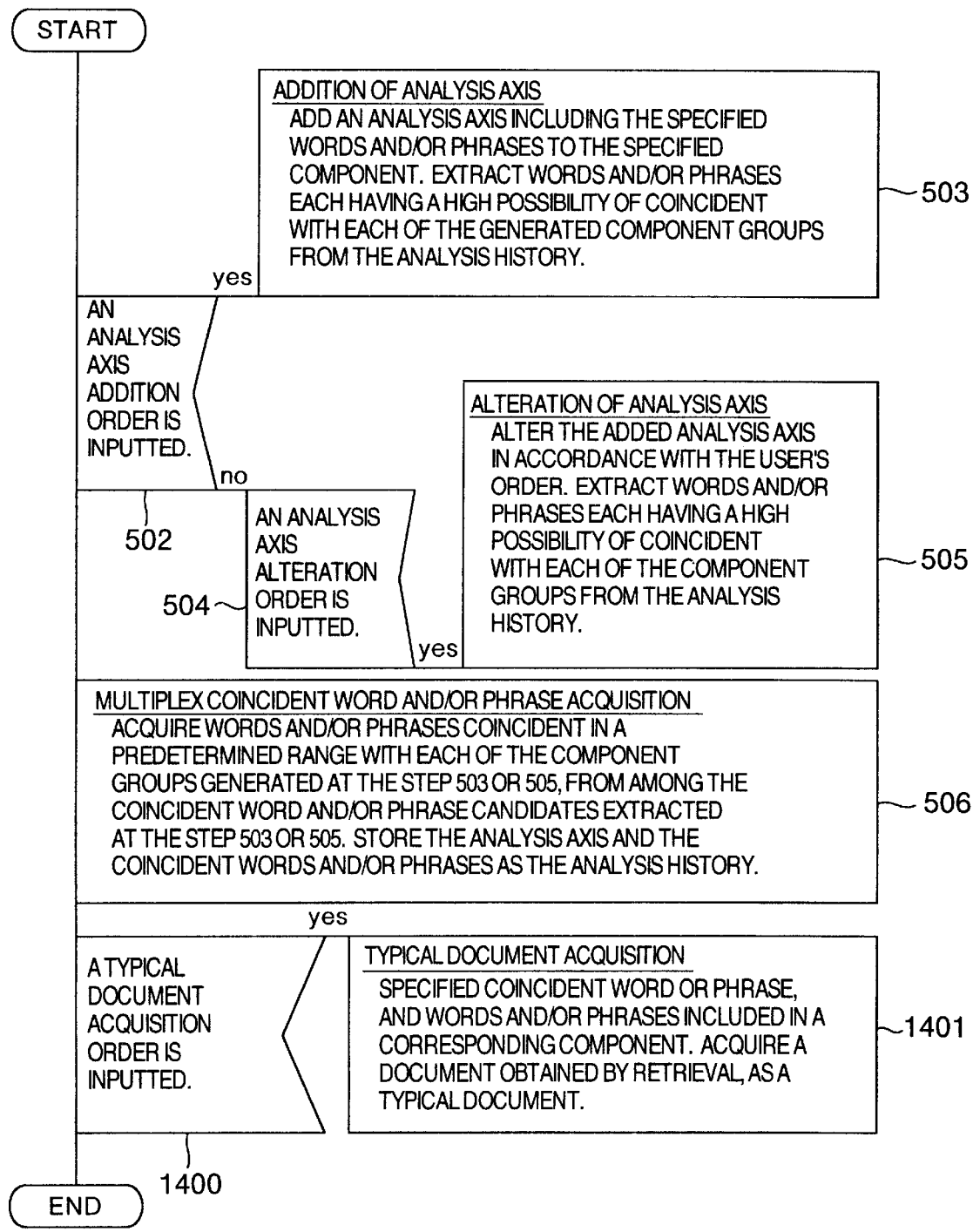
FIG. 14 is a PAD diagram showing processing contents of a multiplex analysis program 116a in a third embodiment of the present invention.

Hereafter, repetitive processing conducted by the multiplex analysis program 116a of step 501 and subsequent steps peculiar to the third embodiment will be described by referring to FIG. 14.

First, at step 502, it is determined whether an analysis axis addition order is inputted by the user. If an analysis axis addition order is judged to have been inputted, then at step 503 the analysis axis addition program 117 is started. An analysis axis including the specified words and/or phrases is added to the specified component, and groups formed of the specified component and components of the added analysis axis are generated. In addition, words and/or phrases each having a high possibility of coincidence with each of the generated component groups are extracted from the analysis history file 108 as coincident word and/or phrase candidates. If an analysis axis addition order is judged at the step 502 not to have been inputted, then at step 504 it is determined whether an analysis axis alteration order has been inputted. If an analysis axis alteration order is judged at the step 504 to have been inputted, then at step 505 the analysis axis alteration program 118 is started. The added analysis axis is altered in accordance with the user's order. In addition, words and/or phrases each having a high possibility of coincidence with each of the component groups are extracted from the analysis history file 108 as coincident word and/or phrase candidates. Subsequently, at step 506, the multiplex coincident word and/or phrase acquisition program 119 is started. Then, from among the coincident word and/or phrase candidates extracted at the step 503 or 505, words and/or phrases coincident in a predetermined range with each of the component groups generated at the step 503 or 505 are acquired. The analysis axis and the coincident words and/or phrases are stored in the analysis history file 108 as the analysis history. To this point, the processing contents are the same as those of the first embodiment. In the third embodiment, it is further determined at step 1400 whether a typical document acquisition order has been inputted by the user. If a typical document acquisition order is judged at the step 1400 to have been inputted, then at step 1401 the typical document acquisition program 1300 is started and typical document acquisition processing is executed. In the present processing, retrieval of a document set which has become the subject of text mining is conducted by using a coincident word or phrase specified from out of a text mining result and words and/or phrases included in a component corresponding to the specified coincident word or phrase. A document obtained as a retrieval result is acquired as a typical document.

Figure 15:
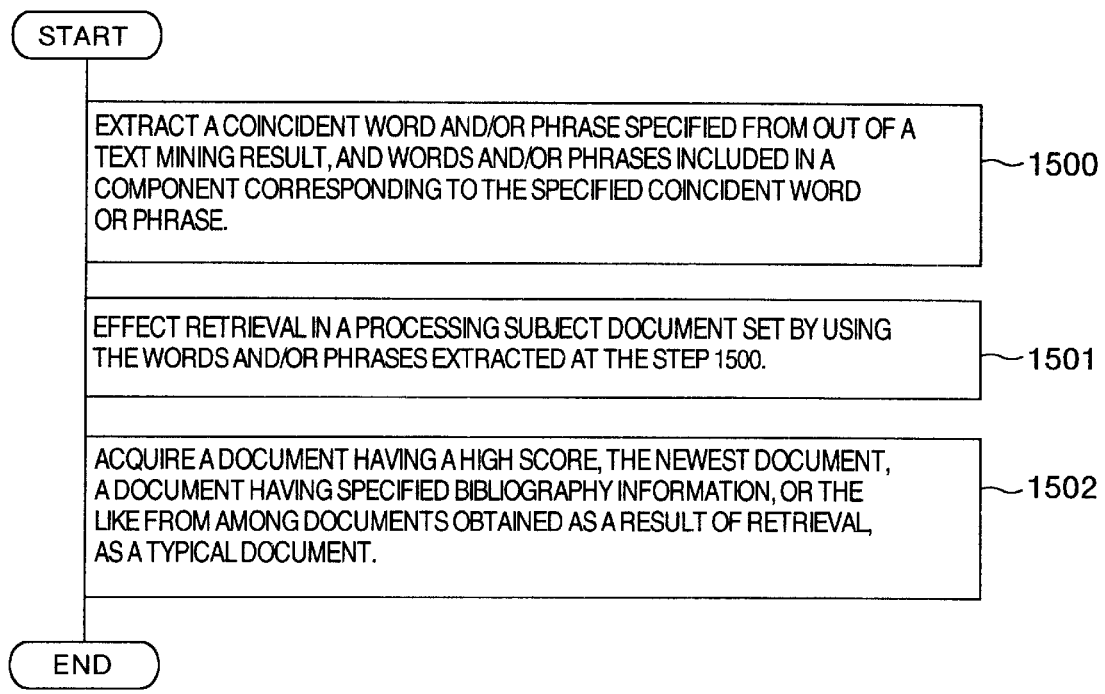
FIG. 15 is a PAD diagram showing processing contents of typical document acquisition processing in a third embodiment of the present invention.

Details of the typical document acquisition processing in the step 1401 is shown in FIG. 15. In the typical document acquisition processing, first at step 1500, a coincident word or phrase specified from out of a text mining result and words and/or phrases included in a component corresponding to the specified coincident word or phrase are extracted.

Here, a plurality of words and/or phrases may be specified. Subsequently, at step 1501, a document set which has become the subject of text mining is subjected to retrieval by using the words and/or phrases extracted at the step 1500. Finally at step 1502, a document having a high score, the newest document, a document having specified bibliography information, or the like is acquired from among documents obtained as a result of retrieval, as a typical document.

Heretofore, the processing contents in the present embodiment have been described in detail.

Hereafter, the contents of the typical document acquisition processing shown in FIG. 15 peculiar to the third embodiment will be described concretely by referring to FIG. 12.

In the typical document acquisition processing, first at step 1500, a coincident word or phrase specified from out of a text mining result and words and/or phrases included in a component corresponding to the specified coincident word or phrase are extracted. Here, a plurality of words and/or phrases may be specified. In the example shown in FIG. 12, a word "secondary" coincident with "July—infection" is selected, and a typical document acquisition order is inputted. As a result, the specified word "secondary" and words "July" and "infection" included in the corresponding component are extracted. Subsequently, at step 1501, retrieval is effected on a document set which has become the subject of text mining by using the words extracted at the step 1500. In the example shown in FIG. 12, retrieval is effected under a retrieval condition of "secondary", "July", and "infection". This means finding out "a document including "secondary", "July", and " infection".

In the retrieval condition used here, all retrieval words are treated with the same weights. However, the retrieval words and/or phrases may be provided with weights according to the addition order of analysis axes. Finally at step 1502, a document having a high score, the newest document, a document having specified bibliography information, or the like is acquired from among documents obtained as a result of retrieval at the step 1501, as a typical document. In the example shown in FIG. 12, the following document is acquired as a typical document. "Publishing month: July. "It has been announced that pathogenic colon bacilli 'O157' was newly detected from an elementary school boy. This boy was hospitalized three days ago because of stomachache and bloody excrement. Since O157 was detected from this boy's brother, there is a possibility that secondary infection occurred in the home."

As heretofore described, according to the method in the present embodiment, a typical document closely related to a specified word or phrase and a corresponding component is acquired. It becomes possible to provide such a document processing system that the user can analyze the tendency of the document set suitably and easily by perusing the typical document.

In the embodiments heretofore described, the analysis axis and the analysis result are preserved as the analysis history. In addition, a different analysis axis is added to a specified component of the analysis axis. Words and/or phrases coincident with each of groups formed of the specified component and components of the added analysis axis are acquired. As a result, it becomes possible to provide a text mining function capable of interactively making an analysis from a wide variety of visual points. Thus, it becomes possible to implement a document processing system whereby the user can analyze the tendency of the document set suitably and easily.

According to the present invention, it becomes possible to provide a text mining function allowing analysis from a plurality of visual points.

What is claimed is:

1. A text mining method comprising:
    a distinctive character string extracting step of extracting character strings characteristically emerging in a processing subject document set obtained by taking out a whole or a part of a set of documents registered beforehand;
    a definition information setting step of setting definition information including a character string specified by a user or bibliography information specified by the user;
    a coincident character string acquisition step of acquiring coincident character strings which coincide in a predetermined range with a character string or bibliography information included in said definition information from among character strings extracted at said distinctive character string extracting step; and
    a multiplex coincident character string acquisition step of acquiring coincident character strings which coincide in a predetermined range with an individual word or phrase or bibliography information acquired from each of a said definition information.

2. A text mining method according to claim 1, wherein said processing subject document set is a document set obtained by effecting retrieval by using a character string, a sentence, or a document as a retrieval condition.

3. A text mining method according to claim 1, further comprising a definition information addition step of adding definition information including a character string specified by a user or bibliography information specified by a user.

4. A text mining method according to claim 1, further comprising:
    a definition information addition step of adding definition information including a character string specified by a user or bibliography information specified by a user; and
    a definition information alteration step of altering a character string or bibliography information included in definition information specified by a user to a character string specified by a user or bibliography information specified by a user.

5. A text mining method according to claim 4, wherein said coincident character string acquisition step comprises:
    an analysis history storage step of storing said coincident character strings and a character string or bibliography information included in said definition information which coincide in a predetermined range with said coincident character string as analysis history,
    said definition information addition step comprises:
        a pre-addition coincident character string extraction step of extracting coincident character strings obtained as those which coincide with a character string or bibliography information acquired from each of said definition information before addition of definition information, from said analysis history, and putting forward the extracted coincident character strings as candidates of the coincident character strings of said multiplex coincident character string acquisition step, said definition information alteration step comprises:
  a pre-alteration coincident character string extraction step of extracting coincident character strings obtained as those which coincide with a character string or bibliography information acquired from each of said definition information before addition of said altered definition information, from said analysis history, and putting forward the extracted coincident character strings as candidates of the coincident character strings of said multiplex coincident character string acquisition step, and
  said multiplex coincident character string acquisition step comprises:
    a coincident character string fixing step of acquiring coincident character strings which coincide in a predetermined range with an individual character string or bibliography information acquired from each of said definition information pieces, from among coincident character string candidates acquired at said pre-addition coincident character string extraction step or said pre-alteration coincident character string extraction step; and
    a multiplex analysis history storage step of storing said coincident character strings, and an individual character string or bibliography information acquired from each of said definition information which coincide in a predetermined range with said coincident character strings, as said analysis history.

6. A text mining method according to claim 1, wherein said predetermined range is 1-characters, m-words, n-sentences, or a range specified by user.

7. A text mining method according to claim 1, wherein said character string is a word or phrase.

8. A text mining method according to claim 4, wherein said definition information addition step comprises:
  a character string addition step responsive to specification of a coincident character string specified by a user based on a newest text mining display result, of adding definition information including said coincident character string specified by a user,
  said definition information alteration step comprises:
    a character string alteration step responsive to specification of a coincident character string specified by a user based on a text mining display result other than the newest one, of altering a character string or bibliography information included in specified definition information specified by a user to said coincident character string specified by a user, and
  said multiplex coincident character string acquisition step comprises:
    a multiplex coincident character string display step of acquiring and displaying coincident character strings which coincide in a predetermined range with an individual character string or bibliography information acquired from each of said definition information.

9. A text mining method according to claim 1, further comprising a typical document acquisition step of acquiring a document from said processing subject document set, said document being closely related to a coincident character string specified by a user, and a character string or bibliography information included in said definition information which coincide in a predetermined range with said coincident character string.

10. A text mining method according to claim 1, further comprising a typical document acquisition step of acquiring a document from said processing subject document set, said document being closely related to a coincident character string specified by a user, and a character string or bibliography information acquired from each of definition information which coincide in a predetermined range with said coincident character string.

11. A text mining method according to claim 10, wherein said typical document acquisition step comprises:
  a retrieval character string extraction step of extracting a coincident character string specified by a user, and a character string or bibliography information acquired from each of said definition information which coincide in a predetermined range with said coincident character string;
  a related document retrieval step of retrieving a document closely related to the character string or bibliography information extracted at said retrieval character string extraction step; and
  a typical document extraction step of extracting a document closely related to the character string or bibliography information extracted at said retrieval character string extraction step as a typical document, from among documents obtained as a result of retrieval at said related document retrieval step.

12. A text mining method according to claim 11, wherein said related document retrieval step is a weighted related document retrieval step of retrieving a closely related document by providing the character strings or bibliography information extracted at said retrieval character string extraction step with weights in order of addition to said plurality of definition information.

13. A text mining method according to claim 11, wherein said related document retrieval step extracts a document having a newest registration date instead of a closely related document, as a typical document.

14. A text mining method according to claim 11, wherein said related document retrieval step extracts a document having bibliography information specified by a user instead of a closely related document, as a typical document.

15. A text mining apparatus comprising:
  distinctive character string extraction means for extracting character strings characteristically emerging in a processing subject document set obtained by taking out a whole or a part of a set of documents registered beforehand;
  definition information setting means for setting definition information including a character string specified by a user or a bibliography information specified by the user;
  coincident character string acquisition means for acquiring coincident character strings which coincide in a predetermined range with a character string or bibliography information included in said definition information from among character strings extracted by said distinctive character string extraction means; and
  multiplex coincident character string acquisition means for acquiring coincident character strings which coincide in a predetermined range with a character string or bibliography information acquired from each of said definition information.

16. A storage medium for storing programs to construct a text mining system, said storage medium comprising:
  a distinctive character string extraction module for extracting character strings characteristically emerging in a processing subject document set obtained by taking out a whole or a part of a set of documents registered beforehand;

a definition information setting module for setting definition information including a character string specified by a user or a bibliography information specified by the user;

a coincident character string acquisition module for acquiring coincident character strings which coincide in a predetermined range with a character string or bibliography information included in said definition information from among character strings extracted by said distinctive character string extraction module; and a multiplex coincident character string acquisition module for acquiring coincident character strings which coincide in a predetermined range with an individual character string or bibliography information acquired from each of said definition information.

17. A text mining method according to claim 2, wherein said predetermined range is 1-characters, m-words, n-sentences, or a range specified by a user.

* * * * *